April 1, 1924.    
A. J. ELVIN  
WINDSHIELD PROTECTOR  
Filed March 14, 1922    2 Sheets-Sheet 2
1,488,977
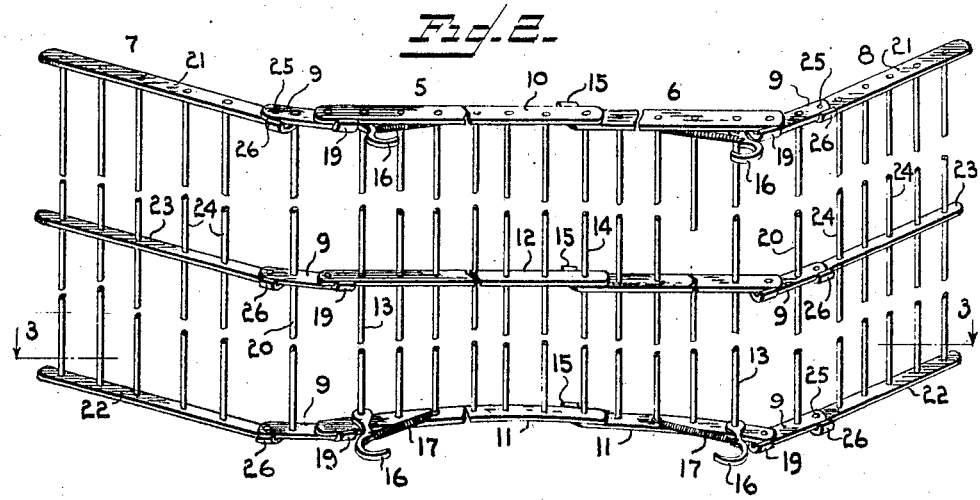
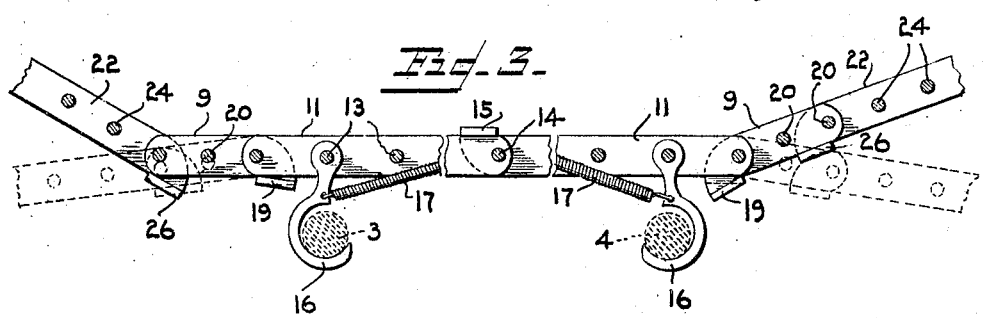
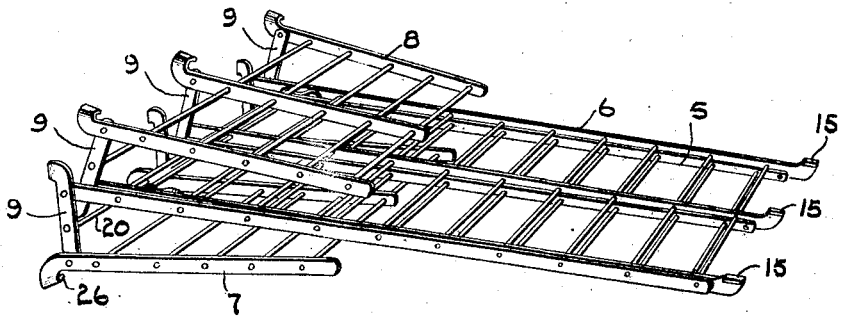
Austin J. Elvin
INVENTOR
WITNESSES Patented Apr. 1, 1924.

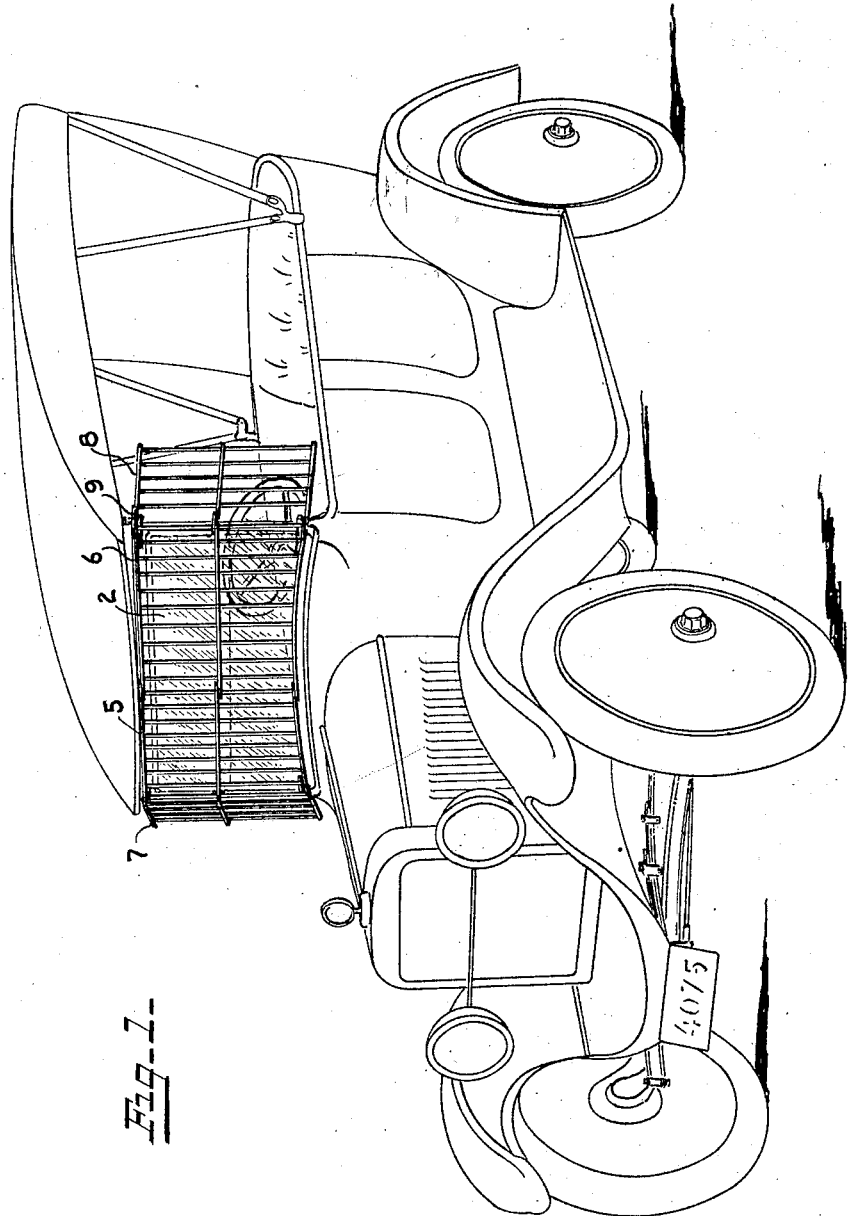

1,488,977

UNITED STATES PATENT OFFICE.

AUSTIN J. ELVIN, OF JEFFERSON, IOWA.

WINDSHIELD PROTECTOR.

Application filed March 14, 1922. Serial No. 543,727.

*To all whom it may concern:*

Be it known that I, AUSTIN J. ELVIN, a citizen of the United States, residing at Jefferson, in the county of Greene and State of Iowa, have invented new and useful Improvements in Windshield Protectors, of which the following is a specification.

This invention relates to windshield guards used in connection with automobiles. In small towns and in the country districts automobilists are allowed to park their cars near the fouling line of a base-ball diamond, and it frequently happens that the ball is thrown or batted so as to crash through the windshield and break the same, as well as injure the occupants of the car, and it is, therefore, the object of my invention to provide an improved device for protecting windshields and also the occupants of automobiles from injury by base balls unintentionally thrown or batted into the car while the occupants are watching the game.

The invention contemplates the provision of a guard composed of a series of hingedly connected sections which, being of light construction, though capable of resisting the force of a base ball, under such conditions, may be readily applied to the windshield of a car by one person, and when not in use, may be folded into a neat and compact unit and stored in a small space in the automobile.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appending claims.

In the drawing:

Figure 1 is a view in perspective of an automobile with my improved guard applied to the windshield;

Figure 2 is a rear view in perspective of the guard detached from the windshield;

Figure 3 is a horizontal section of the guard taken along the line 3—3 of Figure 2;

Figure 4 is a view in perspective of the guard folded into a compact unit and ready for storage.

Referring to the drawing, the automobile shown in Figure 1 is provided with a windshield 2 supported by posts 3 and 4 mounted upon opposite sides of the dash of the automobile.

The base ball guard which constitutes my invention is removably connected to the posts 3 and 4 and comprises sections 5 and 6 hingedly connected to each other at their inner ends, and side wings 7 and 8 hingedly connected in spaced relation to the free ends of the sections 5 and 6 by means of spaced links 9.

Each section 5 and 6 of the windshield is composed of top, bottom, and intermediate spaced horizontal bars 10, 11 and 12, respectively, connected together by means of spaced vertical rods 13, the rods 13 being secured at their outer ends respectively to the upper and lower bars 10 and 11, and passing through perforations in the intermediate bar 12. One of the rods indicated as 14 forms a common connecting rod for the inner ends of the horizontal bars of each section, and also a hinged mounting for the inner ends of the sections 5 and 6.

The inner ends of the horizontal bars of section 6 of the protector are provided with upstanding offset lugs 15 adapted to respectively engage the outer edges of the spaced horizontal bars of section 5, whereby the two sections 5 and 6 are limited in their movements on the rod 14 and maintained in alinement with each other, when hooks 16 pivotally mounted on the end vertical rods 13 of said sections are engaged respectively with the posts 3 and 4 supporting the windshield.

A spring 17 connected at one end to the hooks or latches 16 and at its other end with one of the vertical rods 13 is adapted to maintain the latches 16 in engagement with the windshield posts 3 and 4.

The outer free ends of the horizontal bars 10, 11 and 12 of the sections 5 and 6 of the guard, are provided with pivotally mounted links 9, each link having an upstanding offset lug 19 adapted to engage the inner edge of the respective horizontal bars of the sections 5 and 6, to which the links are pivoted. The lugs 19 limit the movement of the links relative to the horizontal bars of the sections, and are maintained thereby in certain angular positions relative to the horizontal bars. A rod 20 connects the spaced links 9 on each free end of the sections 5 and 6.

Each of the wings 7, 8, is composed of a top horizontal bar 21, a bottom horizontal bar 22, and an intermediate horizontal bar 23 spaced from each other and connected by spaced vertical rods 24.

The inner ends of the horizontal bars 21, 22 and 23 are pivotally connected at 25 to one end of each of the links 9 which ends are opposite to the pivotal connection between the links and the free ends of the sections 5 and 6 of the guard. The inner ends of these horizontal bars are provided with upstanding offset lugs 26 adapted to engage one edge of the links 9 to maintain the wings 7 and 8 in a certain angular position relative to the sections 5 and 6, when the guard is connected to the windshield of an automobile.

As shown in Figure 1, when the guard is positioned on the automobile by means of the latches 16, which are pivotally mounted upon the rods 13, a pair of these latches being connected to the posts 3, 4, both at the top and bottom of the sections 5 and 6, the sections 5 and 6 will be spaced from the windshield 2, while the wings 7 and 8 will be located at an angle to the respective sections and will extend rearwardly of the windshield. The respective lugs 15, 19, 26 provided on the wings 7, 8, the links 9 and the sections 5 and 6, will engage the adjacent horizontal bars of the different parts forming the guard, and maintain the wings and sections in proper protecting relation with the windshield and the occupants of the car.

When it is desired to remove the protector and store it in the car, the several latches 16 are released from the posts 3 and 4, and the guard is folded up in the manner disclosed in Figure 4 of the drawings.

The section 5 is folded onto section 6 of the guard, while the wings 7 and 8 are folded back on the respective sections 5 and 6. The links 9 space the inner ends of the wings away from the sections 5 and 6 so that when the wings are folded upon their respective sections, the outer free ends of the wings will lie flat against the said sections and form a neat and more compact folded unit.

The spacing between the vertical rods 13 of the sections 5 and 6 and the vertical rods 24 of the wings is such as to prevent the passage of a base ball between them. The rods and the horizontal bars constitute a protective grating.

The device is applicable to any automobile and requires no skill or tools to either apply or remove the same from the car. Instead of two front or main sections, a single main section may be employed covering the front of the automobile windshield, and the side wings may be hingedly connected to the main section.

What is claimed is:

1. A windshield protector comprising a pair of similar sections hingedly connected together end to end, so as to fold along a transverse line, spring-held latches pivoted to the free ends of the sections and engageable with the posts of a windshield to support the protector in fixed position in advance of the windshield, said sections being formed with a protective grating.

2. A windshield protector comprising a plurality of sections hingedly connected together end to end so as to fold transversely, and spring-held opposed latches pivoted to certain of the sections and engageable with the posts of a windshield to support the protector in advance thereof, said sections being provided with protective gratings.

3. A windshield protector comprising two substantially similar sections hingedly connected together so as to fold in the middle, latch means connected to the free ends of the sections and engageable with the posts of a windshield to support the protector in advance thereof, wings located adjacent the free ends of the sections, links hingedly connecting the wings to the free ends of the sections, and lugs formed on the wings and links limiting the backward swinging movement thereof.

4. A windshield protector comprising a plurality of substantially similar sections hingedly connected together end to end and foldable on each other, each section being formed of a plurality of spaced horizontal bars connected by a plurality of spaced vertical rods to form a protective grating, means connected to the free ends of the sections for removably securing the sections to the windshield, a portion of one section extending beyond the hinged connection of the sections and provided with lugs engaging portions of the adjacent section to hold said sections in a predetermined position.

5. A windshield protector comprising a plurality of sections hingedly connected together, each section being formed of a plurality of spaced horizontal bars connected by a plurality of spaced vertical rods, the horizontal bars of one section extending beyond the hinged connection of the sections and provided with lugs engaging the horizontal bars of the other section and adapted to maintain the sections in a predetermined position, and means engageable with the posts of a windshield to support the protector in advance thereof.

6. A windshield protector comprising a plurality of sections hingedly connected together, each section formed of a plurality of spaced horizontal bars connected by a plurality of spaced vertical rods, the horizontal bars of one section extending beyond the hinged connection of the sections and provided with lugs engaging the horizontal bars of the other section and adapted to maintain the sections in alinement or at an angle, wings pivotally mounted at the free ends of the sections, and means for limiting the backward swinging movement of the wings.

7. A windshield protector comprising a plurality of sections hingedly connected together, each section formed of a plurality of spaced horizontal bars connected by a plurality of spaced vertical rods, the horizontal bars of one section extending beyond the hinged connection of the sections and provided with lugs engaging the horizontal bars of the other section and adapted to maintain the sections in alinement or at an angle, and means for removably securing the sections to the windshield.

8. A windshield protector comprising a plurality of sections hingedly connected together, each section formed of a plurality of spaced horizontal bars connected by a plurality of vertical rods, the horizontal bars of one section extending beyond the hinged connection of the sections and provided with lugs engaging the horizontal bars of the other section, means for removably securing the sections to the windshield, wings formed of horizontal bars and connecting vertical rods, said horizontal bars being provided with lugs, links hingedly connecting the wings to the free ends of the sections, and lugs formed on the links and engaging the horizontal bars of the sections, the lugs being adapted to maintain the sections, the wings and links in a predetermined relation with each other.

9. A windshield protector comprising a plurality of substantially similar sections hingedly connected together end to end and foldable on each other, each section formed of a plurality of spaced horizontal bars connected by a plurality of spaced vertical rods to form a protective grating, means for removably securing the sections to the windshield, and lugs provided on one section and engaging the adjacent section to hold the sections in predetermined position.

10. A windshield protector comprising two like sections hingedly connected together and foldable on each other, each section formed of a plurality of spaced horizontal bars connected by a plurality of spaced vertical rods, means for removably securing the sections to the windshield, wings formed of horizontal bars and connecting vertical rods, pairs of spaced links adapted to hingedly connect the wings to the free ends of the sections, means projecting from the horizontal bars of the wings and the links and respectively engaging the links and the horizontal bars of the sections for maintaining the links and wings in a predetermined position, and means on the horizontal bars of one of the sections engaging the horizontal bars of the other section for maintaining the sections in alinement, when said sections are secured to the windshield.

11. In combination with a windshield having vertical spaced posts, a guard composed of a plurality of sections forming a protective grating, said sections being foldable one upon the other when not in use, and yieldable hooks carried by the sections to engage the posts to hold the sections in spaced relation to the windshield, and said hooks permitting the quick attachment and detachment of the guard as a unit from the windshield.

12. In combination with a windshield, a guard composed of a plurality of sections formed of a protective grating, said sections being foldable one upon the other when not in use, and yieldable latch means carried by the sections to engage the windshield to hold the sections in spaced relation to the windshield, said latch means permitting the ready attachment and detachment of the guard bodily from the windshield and the folding up of the sections.

In testimony that I claim the foregoing as my own, I have hereto affixed my signature.

AUSTIN J. ELVIN.